(12) United States Patent
Moyano et al.

(10) Patent No.: US 12,173,172 B2
(45) Date of Patent: Dec. 24, 2024

(54) THERMALLY CURABLE FILM-FORMING COMPOSITIONS PROVIDING BENEFITS IN APPEARANCE AND SAG CONTROL PERFORMANCE

(71) Applicant: PPG Industries Ohio, Inc., Cleveland, OH (US)

(72) Inventors: Daniel F. Moyano, Pittsburgh, PA (US); Matthew S. Luchansky, Wexford, PA (US); Mitchell R. Stibbard, Mars, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 364 days.

(21) Appl. No.: 16/956,970

(22) PCT Filed: Dec. 22, 2017

(86) PCT No.: PCT/US2017/068113
§ 371 (c)(1),
(2) Date: Jun. 22, 2020

(87) PCT Pub. No.: WO2019/125482
PCT Pub. Date: Jun. 27, 2019

(65) Prior Publication Data
US 2020/0392365 A1    Dec. 17, 2020

(51) Int. Cl.
| | | |
|---|---|---|
| *C09D 133/06* | (2006.01) | |
| *B05D 1/02* | (2006.01) | |
| *B05D 3/02* | (2006.01) | |
| *C09D 7/47* | (2018.01) | |
| *C09D 7/63* | (2018.01) | |
| *C09D 7/65* | (2018.01) | |
| *B29C 71/02* | (2006.01) | |
| *C08J 7/04* | (2020.01) | |
| *C08K 3/36* | (2006.01) | |
| *C08K 5/21* | (2006.01) | |

(52) U.S. Cl.
CPC ........... *C09D 133/066* (2013.01); *B05D 1/02* (2013.01); *B05D 3/0254* (2013.01); *C09D 7/47* (2018.01); *C09D 7/63* (2018.01); *C09D 7/65* (2018.01); *C08J 7/0423* (2020.01); *C08J 7/08* (2013.01); *C08J 2375/06* (2013.01); *C08K 3/36* (2013.01); *C08K 5/21* (2013.01)

(58) Field of Classification Search
CPC ........ C09D 133/066; C09D 7/65; C09D 7/47; C09D 7/63; B05D 1/02; B05D 3/0254; C08J 7/0423; C08J 7/08; C08J 2375/06; C08K 3/36; C08K 5/21
See application file for complete search history.

(56) References Cited

U.S. PATENT DOCUMENTS

| | | | |
|---|---|---|---|
| 5,731,086 A | 3/1998 | Gebhardt et al. | |
| 5,965,272 A * | 10/1999 | Donnelly ............ | C08G 18/6295 525/107 |
| 7,576,151 B2 * | 8/2009 | Brinkhuis .......... | C08G 18/4063 524/211 |
| 7,910,211 B2 | 3/2011 | Avgenaki et al. | |
| 8,258,225 B2 | 9/2012 | Barkac et al. | |
| 2006/0270782 A1 | 11/2006 | Huybrechts et al. | |
| 2007/0049660 A1 | 3/2007 | Wilkenhoener et al. | |
| 2011/0281115 A1 * | 11/2011 | Kania ................. | C09D 133/14 528/308 |
| 2012/0053274 A1 * | 3/2012 | Yokoyama ........... | C08G 18/792 524/211 |
| 2012/0282834 A1 | 11/2012 | Palm et al. | |
| 2015/0056375 A1 | 2/2015 | Saliya et al. | |
| 2015/0337166 A1 | 11/2015 | Yokoyama et al. | |
| 2016/0017158 A1 * | 1/2016 | Uhlianuk ............ | C08G 18/2865 524/874 |
| 2016/0024356 A1 | 1/2016 | Salnikov et al. | |

FOREIGN PATENT DOCUMENTS

| | | |
|---|---|---|
| EA | 000986 B1 | 8/2000 |
| RU | 2395537 C2 | 7/2010 |
| RU | 2403094 C2 | 11/2010 |
| RU | 2413740 C2 | 3/2011 |
| RU | 2430942 C2 | 10/2011 |
| RU | 2554864 C2 | 6/2015 |

\* cited by examiner

*Primary Examiner* — Robert S Walters, Jr.
(74) *Attorney, Agent, or Firm* — Christopher T. Meta

(57) ABSTRACT

Disclosed are thermally curable film-forming compositions comprising a binder, a flow control system comprising a sag control agent, and less than 5.0 wt.-% of melamine-based components, based on the total weight of resin solids in the film-forming composition, as well as methods for forming a cured coating on a substrate and substrates comprising the cured coating layer.

20 Claims, No Drawings

THERMALLY CURABLE FILM-FORMING COMPOSITIONS PROVIDING BENEFITS IN APPEARANCE AND SAG CONTROL PERFORMANCE

FIELD OF THE INVENTION

The present invention relates to thermally curable film-forming compositions comprising a binder, a flow control system comprising a sag control agent, and less than 5.0 wt. % of melamine-based components, based on the total weight of resin solids in the film-forming composition. The present invention also relates to methods for forming a cured coating on a substrate and to substrates comprising the cured coating layer.

BACKGROUND OF THE INVENTION

Coatings are used to protect surfaces and enhance the appearance and functional properties of substrates coated therewith. For instance, original finishes for vehicles, such as automobiles, can include at least one of the following coating layers: a primer layer, a basecoat layer which is often colored or pigmented and a clear coat or topcoat layer. Many coatings are applied to surfaces in the form of liquid coating compositions, e.g. by spraying, to form a liquid coating film on the surface, which may then be dried and/or cured to form the coating layer. For a glossy appearance, the surface of the coating layer should be as smooth as possible. However, various different parameters influence the final appearance of a coating layer, and final appearance has been found to be hard to predict from the rheological properties of the liquid coating composition.

For, instance, after application, the viscosity of the coating composition should be low enough to evenly flow over the substrate to level out unevenness caused by the application of the coating composition and/or resulting from the underlying surface. At the same time viscosity should be high enough so that the liquid coating film does not sag or form tears, in particular when the coating composition is applied to a non-horizontal surface. Further, even if a liquid coating film had sufficiently leveled out after application, temperature-induced viscosity changes and/or release of volatile compounds in subsequent drying and/or curing steps may cause further effects deteriorating appearance, such as e.g. telegraphing.

It would be desirable to provide a thermally curable film-forming composition that demonstrates both improved appearance properties and sag control performance.

SUMMARY OF THE INVENTION

The present invention provides a thermally curable film-forming composition comprising a binder, a flow control system comprising a sag control agent for controlling the viscosity of the film-forming composition applied to a surface, wherein during flash off and baking the complex viscosity $\eta^*$, of the film-forming composition does not drop below the initial complex viscosity $\eta^*_1$, and wherein the film-forming composition comprises less than 5.0 wt.-% of melamine-based components, based on the total weight of resin solids in the film-forming composition.

Further provided is a method of forming a cured coating layer on a substrate comprising applying the present composition to at least a portion of a surface of the substrate and thermally curing the applied composition.

Additionally provided is a substrate comprising a cured coating layer obtained by applying the present composition to at least a portion of a surface of the substrate and thermally curing the applied composition.

DETAILED DESCRIPTION

Other than in the operating examples, or unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 4 to 5, etc.). Furthermore, when numerical ranges of varying scope are set forth herein, it is contemplated that any combination of these values inclusive of the recited values may be used.

Plural referents as used herein encompass singular and vice versa. For example, while the invention has been described in terms of "a" binder, "a" sag control agent, "a" crosslinking agent, "a" polyol, "a" polyisocyanate, or "an" additional coating layer, a plurality, including a mixture of such binders, sag control agents, crosslinking agents, polyols, or polyisocyanates, respectively, and more than one, e.g. two, three, four, five, six etc. additional coating layers, can be used.

As used herein, the term "polymer" refers to oligomers and both homopolymers and copolymers. The prefix "poly" refers to two or more. For instance, a polyisocyanate refers to a compound comprising two or more isocyanate groups and a polyol refers to a compound comprising two or more hydroxyl groups. Including, for example and like terms means including for example but not limited to.

Unless indicated otherwise, molecular weights are on a weight average basis ("Mw") and are determined by gel permeation chromatography using polystyrene standards.

Any numeric references to amounts, unless otherwise specified, are "by weight".

The term "on", when used in the context of a coating applied on a surface or a substrate, includes both coatings applied directly or indirectly to the surface or substrate. Thus, for example, a coating applied to a primer layer overlying a substrate constitutes a coating applied on the substrate. Likewise a coating layer deposited or disposed "below" another coating layer includes both coatings deposited directly, i.e. so that is in direct physical contact therewith, or indirectly below said coating layer.

As used herein, the term "flash off" refers to the step of keeping the wet film-forming composition applied to a surface or a substrate at a lower temperature, e.g. being within the range of from 20 to 25° C., before raising the temperature for thermally curing the coating, to ensure that volatile components, e.g. fast evaporating solvents, leave the coating film.

As used herein, the term "thermally curing" refers to the step of exposing a film-forming composition applied to a surface or a substrate to temperatures above 25° C. to induce irreversible setting or curing of the coating, e.g. by crosslinking, wherein the polymer chains of the polymeric components are joined together by covalent bonds. This may be done in an oven. For instance, in automotive OEM applications temperatures up to 180° C. may be used, the step of thermally curing at such temperatures is often referred to as stoving or baking. Plastic parts and other non-heat resistant accessories of a vehicle would not withstand such high temperatures. Therefore, in refinish applications, the film-forming compositions are usually exposed to temperatures below 80° C., e.g. up to 75° C., 70° C., 65° C. or 60° C. for thermally curing. Once cured or crosslinked, the coating will not melt upon the application of heat and does not easily dissolve in water or organic solvents.

As used herein, the phrase "based on the total weight of resin solids" in the composition means that the amount of the respective component added during the formation of the composition is based upon the total weight of the resin solids (non-volatiles) of the film-forming materials, including crosslinking agents and polymers present during the formation of the composition, but not including any water, organic solvent, or any additive solids such as a crystalline sag control agent (SCA), hindered amine stabilizers, photoinitiators, pigments including extender pigments and fillers, flow modifiers, catalysts, and UV light absorbers.

As used herein, the phrase "based on the total amount of solids" in the composition means that the amount of the respective component added during the formation of the composition is based upon the total amount of solids (non-volatiles) in the film-forming compositions, including any binder components, additional polymers that are present during the formation of the composition, as well as additive solids such as a crystalline sag control agent (SCA), hindered amine stabilizers, photoinitiators, pigments including extender pigments and fillers, flow modifiers, catalysts, and UV light absorbers, but not including any water or organic solvent.

The curable film-forming compositions of the present invention comprise a binder. As used herein the term "binder" refers to a compound or mixture of compounds used to bind the input materials, including pigments, fillers etc., if present, in the film-forming composition and provide adhesion of the coating film to the underlying surface as a continuous film. Binders may have oligomeric or monomeric or, more often, polymeric structures. The binder may comprise a cross-linkable resin and a crosslinker.

The binder used in the present film-forming composition may comprise a polyol, such as an acrylic polyol. The acrylic polyol may be polymeric and may be prepared from a monomer mixture comprising a hydroxyl functional monomer. Mixtures of different acrylic polyols may also be used. The hydroxyl functional monomer may comprise a hydroxyalkyl group.

Suitable acrylic polyols include copolymers of alkyl esters of acrylic acid and/or methacrylic acid (i.e., (meth)acrylates, a term intended to include esters of acrylic acid and/or methacrylic acid), optionally together with other polymerizable ethylenically unsaturated monomers. Useful alkyl esters of acrylic acid or methacrylic acid include aliphatic alkyl esters containing from 1 to 30, and often 2 to 18 carbon atoms in the alkyl group. Non-limiting examples include methyl(meth)acrylate, ethyl(meth)acrylate, butyl (meth)acrylate, and 2-ethylhexyl (meth)acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic polyol includes hydroxyl functional groups, which may be incorporated into the polymer by including hydroxyl functional monomers in the reactants used to produce the copolymer. Useful hydroxyl functional monomers include hydroxyalkyl (meth)acrylates, typically having 2 to 12 carbon atoms in the hydroxyalkyl group, such as hydroxyethyl(meth)acrylate, hydroxypropyl(meth)acrylate, 4-hydroxybutyl(meth)acrylate, 5-hydroxypentyl(meth)acrylate, 6-hydroxyhexyl(meth)acrylate, 8-hydroxyoctyl(meth)acrylate, 9-hydroxynonyl(meth)acrylate, 10-hydroxydecyl (meth)acrylate, 11-hydroxyundecyl(meth)acrylate, 12-hydroxydodecyl(meth)acrylate, and the like; (4-(hydroxymethyl)cyclohexyl)methyl (meth)acrylate; hydroxy functional adducts of caprolactone and hydroxyalkyl (meth)acrylates, as well as the beta-hydroxy ester functional monomers described below. The hydroxyl functional monomer is typically present in the monomer mixture in an amount of at least 5 wt.-%, such as at least 10 wt.-%, or at least 15 wt.-%, and up to 70 wt.-%, or 60 wt.-%, or 50 wt.-%, or 45 wt.-%, or 40 wt.-%, based on the total weight of monomers in the monomer mixture used to prepare the acrylic polyol. Typical ranges are 15 to 60 wt.-% or 15 to 40 wt.-%, based on the total weight of monomers in the monomer mixture used to prepare the acrylic polyol.

Beta-hydroxy ester functional monomers can be prepared from ethylenically unsaturated, epoxy functional monomers and carboxylic acids, or from ethylenically unsaturated acid functional monomers and epoxy compounds which are not polymerizable with the ethylenically unsaturated acid functional monomer.

Useful ethylenically unsaturated, epoxy functional monomers used to prepare the beta-hydroxy ester functional monomers include glycidyl(meth)acrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Examples of carboxylic acids include saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, often containing from 8 to 30 carbon atoms, such as butyl glycidyl ether, octyl glycidyl ether, phenyl glycidyl ether and para-(tertiary butyl)phenyl glycidyl ether. Particular glycidyl esters include those of the structure:

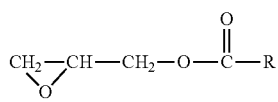

where R is a hydrocarbon radical containing from about 4 to about 26 carbon atoms. Typically, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

Acrylic polymers can be prepared via organic solution polymerization techniques and used directly in the preparation of solventborne film-forming compositions. Generally any method of producing such polymers that is known to those skilled in the art utilizing art recognized amounts of monomers can be used.

An exemplary acrylic polyol may be prepared from a reaction mixture comprising a hydroxyalkyl (meth)acrylate such as 2-hydroxyethyl methacrylate, alkyl esters of (meth) acrylic acid not comprising pendant hydroxyl groups such as a mixture of 2-ethylhexyl acrylate and 2-ethylhexyl methacrylate, an ethylenically unsaturated aromatic monomer such as styrene, and (meth)acrylic acid in a weight ratio of about 35:44:20:1. Another exemplary acrylic polyol may be prepared from a reaction mixture comprising 15 to 20 wt.-% of a hydroxyalkyl (meth)acrylate such as 2-hydroxyethyl methacrylate, 10 to 15 wt.-% of an alkyl ester of (meth) acrylic acid not comprising pendant hydroxyl groups such as 2-ethylhexyl acrylate, 25 to 30 wt.-% of an ethylenically unsaturated aromatic monomer such as styrene, and 35 to 45 wt.-% of a beta-hydroxy ester functional monomer prepared from an epoxy compound not containing ethylenic unsaturation, such as a glycidyl ester of a carboxylic acid having the structure shown above wherein R is a branched hydrocarbon radical having about 10 carbon atoms (commercially available e.g. as Cardura E-10) and (meth)acrylic acid, wherein the amounts are based on the total weight of monomers in the monomer mixture.

The acrylic polyol may have a weight average molecular weight of at least 3000, such as at least 5000, or at least 5500, and of up to 15,000, or up to 10,000, or up to 7500. Weight average molecular weights as reported herein may be determined by gel permeation chromatography (GPC) using polystyrene standards.

The amount of the binder in the thermally curable film-forming composition generally may range from 25 to 95 wt.-%, based on the total weight of resin solids in the curable film-forming composition. For example, the amount of binder may be at least 30 wt.-%, at least 40 wt.-% or at least 50 wt.-%, based on the total weight of resin solids in the curable film-forming composition. The amount of binder may be 95 wt.-% or less, 90 wt.-% or less, 85 wt.-% or less, or 80 wt.-% or less, based on the total weight of resin solids in the curable film-forming composition. Ranges of binder may include, for example, 30 to 90 wt.-%, 40 to 85 wt.-%, or 50 to 80 wt.-%, based on the total weight of resin solids in the curable film-forming composition.

The amount of polyol in the thermally curable film-forming composition generally may range from 20 to 70 wt.-%, based on the total weight of resin solids in the curable film-forming composition. For example, the polyol may be at least at least 25 wt.-%, at least 30 wt.-%, at least 35 wt.-% or at least 40 wt.-%, based on the total weight of resin solids in the curable film-forming composition. The amount of polyol may be 70 wt.-% or less, 65 wt.-% or less, or 60 wt.-% or less, based on the total weight of resin solids in the curable film-forming composition. Ranges of polyol may include, for example, 20 to 70 wt.-%, 25 to 70 wt.-%, 30 to 70 wt.-%, 30 to 60 wt.-%, 35 to 65 wt.-% or 40 to 60 wt.-%, based on the total weight of resin solids in the curable film-forming composition. As used herein, the phrase "amount of polyol" includes the (combined) amount of acrylic polyol and, if present, any additional hydroxy-functional resin material that may react with a crosslinker, e.g. a polyester polyol.

The curable film-forming compositions of the present invention further comprise a flow control system. As used herein the term "flow control system" refers to a compound or mixture of compounds added to a film-forming composition comprising a binder to control rheological behavior of the film-forming composition during application, drying and/or curing, including controlling viscosity, thixotropic properties under shear stress and leveling when applied to a surface or substrate.

The flow control system of the present film-forming composition comprises a sag control agent. As used herein the term "sag control agent" refers to a compound or mixture of compounds added to a thermally curable film-forming composition comprising a binder to minimize sagging, i.e. defects such as tear drops caused by gravity-driven flow of the wet film-forming composition when applied to a substrate, in particular a substrate comprising a non-horizontal, e.g. a vertical surface.

The inventors have studied the rheological profile of known clear coat compositions optimized for appearance. Showing a thixotropic behavior, i.e. thinning under the shear stress applied during e.g. spraying, after being applied to a surface or substrate these compositions typically gain complex viscosity $\eta^*$ at room temperature immediately as the shear stress of application is stopped. Complex viscosity, $\eta^*$, further increases during flash off. When the temperature is raised to induce thermal curing, the complex viscosity, $\eta^*$, first drops significantly below the initial value $\eta^*_1$ to allow for sufficient leveling of the coating film, before the chemical curing reaction actually starts and viscosity rises again. As used herein, complex viscosity $\eta^*$ refers to the frequency-dependent viscosity function determined the film-forming composition by subjecting it to oscillatory shear stress.

It has been found that not only sagging of the film-forming composition, but also appearance of the coating obtained from such a composition can be improved by including a flow control system which comprises a sag control agent if complex viscosity, $\eta^*$, of the composition does not drop below the initial value, $\eta^*_1$, during flash off and thermal curing and the film-forming composition comprises less than 5.0 wt.-% of melamine-based components.

The value of initial complex viscosity, $\eta^*_1$, in the film-forming compositions of the present invention may even be lower than that of the above known formulations. Relative increase in complex viscosity, $\eta^*$, of the present film-forming compositions during flash off may be higher than in the known formulations. For instance, in the film-forming compositions of the present invention the maximum value of complex viscosity, $\eta^*_{max}$, during flash off may be at least three times as high as the initial complex viscosity, $\eta^*_1$, of the same composition, e.g. at least 3.0 or at least 3.1 or at least 3.2 or at least 3.3 or at least 3.4 or at least 3.5 or at least 3.6 or at least 3.7 or at least 3.8 or at least 3.9 or at least 4.0 times as high and up to 8.0 or 7.0 or 6.0 times as high. In the known coating formulations studied, the maximum value of complex viscosity, $\eta^*_{max}$, during flash off is only around 2.8 times the initial complex viscosity, $\eta^*_1$, of said known coating formulations.

Once the temperature is raised, complex viscosity, $\eta^*$, of the present film-forming compositions will drop, but not below their initial complex viscosity, $\eta^*_1$. While in the known formulations studied the minimum value of complex viscosity, $\eta^*_{min}$, observed when raising the temperature above 25° C. in order to induce thermal curing may be as low as e.g. about 0.2 times their initial value, the minimum value of complex viscosity, $\eta^*_{min}$, of the present film-forming compositions is not lower than their initial value, $\eta^*_1$, but may even be higher than said value, e.g. at least 1.05 or at least 1.10 or at least 1.15 or at least 1.20 or at least 1.25 times as high and up to 5.0 or 4.0 or 3.0 or 2.0 times or 1.5 times as high.

The initial complex viscosity, $\eta^*_1$, of the film-forming composition may be at least 150 cP or at least 175 cP or at least 200 cP or at least 225 cP or at least 250 cP or at least 275 cP and up to 350 cP or up to 325 cP or up to 300 cP. A typical range is 200 to 325 cP or 225 to 300 cP The maximum value of complex viscosity, $\eta_{max}^*$, during flash off may be a least 850 cP, or at least 900 cP or at least 950 cP, or at least 1000 cP, and up to 1250 cP, or up to 1200 cP, or up to 1150 cP. A typical range is 950 to 1150 cP or 1000 to 1150 cP. The minimum complex viscosity, $\eta^*_{min}$, of the film-forming composition upon heating may be at least 150 cP or at least 175 cP or at least 200 cP or at least 225 cP or at least 250 cP or at least 275 cP or at least 300 cP and up to 400 cP, or up to 375 cP, or up to 350 cP or up to 325 cP. A typical range is 250 to 375 cP or 275 to 350 cP. The method used for determining complex viscosity $\eta^*$ is described in more detail in the example section below.

As used herein, the term "melamine-based components" refers to melamine (2,4,6-triamino-s-triazine) itself and salts thereof as well as resins obtained by polymerizing melamine with another compound such as e.g. formaldehyde. The film-forming compositions of the present invention comprise less than 5.0 wt.-% of melamine-based components, based on the total weight of resin solids in the film-forming composition and may comprise less than 4.5 wt.-% or less than 4.0 wt.-% or less than 3.5 wt.-% or less than 3.0 wt.-% or less than 2.5 wt.-% or less than 2.0 wt.-% or less than 1.5 wt.-% or less than 1.0 wt.-% or less than 0.5 wt.-% or less than 0.25 wt.-% of melamine-based components. The film-forming composition of the present invention may also be essentially free from melamine-based components. By "essentially free" of a material is meant that a composition has only trace or incidental amounts of a given material, and that the material is not present in an amount sufficient to affect any properties of the composition. If they are present, it is in incidental amounts only, typically less than 0.1 wt.-% or less than 0.01 wt.-%, based on the total weight of resin solids in the film-forming composition.

Agents commonly used in the art for controlling sagging include materials which are particulate at room temperature (23° C.) at least in the absence of a solvent and a shear force, such as fumed silica, so-called microgels comprising crosslinked polymeric particles, and urea-based sag control agents. Usually these materials are also insoluble in the coating compositions and may form a three-dimensional network in the film-forming composition. Said network may disrupt under shear and build-up again over time once the shear stress is stopped, thus imparting a thixotropic behavior to the composition. The primary particle size ($Dv_{50}$) of such particles usually is within the micron or sub-micron range, and may e.g. be within the range of about 0.1 to 10 μm (microns) for urea-based sag control agents, determined using e.g. dynamic light scattering using a Malvern Zetasizer. The flow control system of the present film-forming coating composition may comprise such particulate sag control agents, such as urea-based sag control agents and/or microgels.

The sag control agent in the present film-forming composition may comprise a urea-based sag control agent, i.e. a single urea-based sag control agent or a mixture of two or more different urea-based sag control agents. Urea-based sag control agents include reaction products of reactants comprising an amine and an isocyanate, usually in the form of a bisurea. The reaction product may be crystalline. Suitable isocyanates include polyisocyanates. The polyisocyanate can be aliphatic, aromatic, or a mixture thereof. Although higher polyisocyanates such as isocyanurates of diisocyanates are often used, diisocyanates are more often used. Isocyanate prepolymers, for example reaction products of polyisocyanates with polyols also can be used. Mixtures of polyisocyanates can be used.

The polyisocyanate used to prepare the urea-based sag control agent can be prepared from a variety of isocyanate-containing materials. Examples of suitable polyisocyanates include the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. Trimers prepared from these diisocyanates may also be used.

Suitable amines used to prepare the urea-based sag control agent may be primary or secondary monoamines or mixtures thereof. The amines may be aromatic or aliphatic (e.g., cycloaliphatic). Non-limiting examples of suitable monoamines can include aliphatic polyamines such as ethylamine, isomeric propylamines, butylamines, pentylamines, hexylamines, cyclohexylamine, and benzylamine. In a particular example of the present invention, the reaction product comprises hexamethylene diisocyanate at least partially capped with benzylamine.

The urea-based sag control agent may be added to the curable film-forming composition neat, or may be dispersed in a carrier vehicle such as an acrylic polyol, including those described above with respect to the binder component. An exemplary acrylic polyol used as a carrier vehicle may be prepared from a monomer mixture comprising: (i) 35 to 45 wt.-% of a beta-hydroxy ester functional monomer such as any of those described above, prepared from an ethylenically unsaturated acid functional monomer and an epoxy compound; (ii) 15 to 20 wt.-% of hydroxyethyl methacrylate; (iii) 25 to 30 wt.-% of styrene; and (iv) 10 to 15 wt.-% of 2-ethylhexyl acrylate, wherein the amounts are based on the total weight of monomers in the monomer mixture. When the urea-based sag control agent is dispersed in a carrier vehicle, it is typically present in the dispersion in an amount ranging from 2 to 5 wt.-%, based on the total weight of said dispersion. The urea-based sag control agent (based on the neat sag control agent without carrier vehicle, crystal load) usually present in the curable film-forming composition in an amount of 0.2 to 2 wt.-%, such as 0.3 to 1.8 wt.-% or 0.4 to 1.4 wt.-%, often 0.8 to 1.2 wt.-%, based on the total amount of solids in the curable film-forming composition. The dispersion of the urea-based sag control agent in the carrier vehicle is typically present in the curable film-forming composition in an amount of 5 to 35 wt.-%, often 15 to 25 wt.-%, based on the total weight of resin solids in the curable film-forming composition. It will be understood that a carrier vehicle being suitable as a binder contributes to the above specified amount of binder in the film-forming coating composition.

The flow control system may further comprise additional components, such as e.g. a non-aqueous dispersion of an internally crosslinked organic polymer. The internally crosslinked organic polymer in the non-aqueous dispersion is typically an acrylic polymer and may be prepared from a monomer mixture comprising a monomer having functional groups that allow for crosslinking with itself and potentially with adjacent polymers, allowing for the formation of a gel, such as a microgel. For example, any monomer known in the art which contains at least two ethylenically unsaturated double bonds may be included in the monomer mixture. Suitable monomers include, without limitation, di(meth)acrylates (e.g., hexanediol di(meth)acrylate), ethylene glycol di(meth)acrylate, butanediol di(meth)acrylate, decanediol di(meth)acrylate, or a combination of di(meth)acrylates. An exemplary internally crosslinked organic polymer may be prepared from a monomer mixture comprising: (i) methyl methacrylate; (ii) butyl acrylate; (iii) styrene; and (iv) ethylene glycol dimethacrylate.

The internally crosslinked organic polymer may be dispersed in an organic continuous phase comprising an organic solvent or polymer using high stress mixing or homogenization to form the non-aqueous dispersion. Suitable non-aqueous media for use as the organic continuous phase include ketones such as methyl amyl ketone, and glycol ethers such as 2-butoxyethanol.

The internally crosslinked organic polymer can contain reactive functional groups to crosslink into the binder system and is usually a small portion of the total binder system, such as e.g. up to 5 wt.-%, based on the total weight of the resin solids in the film-forming coating composition. The non-aqueous dispersions produce minimal light scattering, if any at all, so color and appearance properties are not adversely affected.

The film-forming composition of the present invention may comprise less than 1 wt.-% of silica-based rheology control agent, based on the total amount of solids in the film-forming composition, e.g. fumed silica particles conventionally used as rheology control agents. Usually the curable film-forming compositions of the present invention are essentially free of silica-based rheology control agent. By "essentially free" of a material is meant that a composition has only trace or incidental amounts of a given material, and that the material is not present in an amount sufficient to affect any properties of the composition. These materials are not essential to the composition and hence the composition is free of these materials in any appreciable or essential amount. If they are present, it is in incidental amounts only, typically less than 0.1 wt.-% or less than 0.01 wt.-%, based on the total weight of resin solids in the film-forming composition. Further, the film-forming compositions of the present invention may also be essentially free of other inorganic rheology control agents, such as e.g. organoclays.

The curable film-forming compositions of the present invention may further comprise a crosslinking (curing) agent containing functional groups that are reactive with functional groups of the binder. For instance, if the binder comprises a polyol, the crosslinking agent comprises functional groups that are reactive with the hydroxyl functional groups of the binder. Such crosslinking agents typically may comprise one or more polyisocyanates and include those known in the art.

As used herein, the term "polyisocyanate" is intended to include blocked (or capped) polyisocyanates as well as unblocked polyisocyanates. The polyisocyanate can be aliphatic, aromatic, or a mixture thereof. Although higher polyisocyanates such as isocyanurates of diisocyanates are often used, diisocyanates can also be used. Isocyanate prepolymers, for example reaction products of polyisocyanates with polyols also can be used. Mixtures of polyisocyanate crosslinking agents can be used.

The polyisocyanate can be prepared from a variety of isocyanate-containing materials. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used.

Isocyanate groups may be capped or uncapped as desired. If the polyisocyanate is to be blocked or capped, any suitable aliphatic, cycloaliphatic, or aromatic alkyl monoalcohol or phenolic compound known to those skilled in the art can be used as a capping agent for the polyisocyanate. Examples of suitable blocking agents include those materials which would unblock at elevated temperatures such as lower aliphatic alcohols including methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lactams such as epsilon-caprolactam, pyrazoles such as dimethyl pyrazole, and amines such as dibutyl amine.

The film-forming compositions of the present invention may be one-component (1K) or multi-component compositions, such as two component (2K) compositions. A 1K composition will be understood as referring to a composition wherein all the coating components are maintained in the same package after manufacture, during shipping and storage etc. It will be understood that in 1K compositions capped polyisocyanate crosslinking agents will be used to avoid premature crosslinking of the composition prior to use.

The film-forming compositions of the present invention may be two component (2K) compositions which comprise a first component comprising a crosslinkable resin, e.g. an acrylic polyol, and a second component comprising the crosslinking agent, wherein the first and the second component are maintained separately until just prior to use. In a 2K composition, in principle both capped and uncapped polyisocyanates may be used, and uncapped polyisocyanates are typically used. If the flow control system does not comprise any resins capable of reacting with the crosslinking agent, such as e.g. acrylic polyols, e.g. because a neat sag control agent is used, the flow control system may be present in any of the first component or the second component or both. However, it will be understood that a flow control system comprising a resin capable of reacting with the crosslinking agent will be present in the first component, e.g. if a dispersion of a urea-based sag control agent in a carrier vehicle comprising acrylic polyol as described above is used. Further, unless otherwise explicitly stated to the contrary, if the present film-forming composition is a 2K composition, any amount of materials in the film-forming composition specified herein is based on the combined amount of said material in the first and second component, i.e. the whole film-forming compositions.

While in principle melamine and melamine-based resins are common crosslinking agents for acrylic polyols as well, the film-forming compositions of the present invention comprise less than 5.0 wt.-% of melamine-based components, based on the total weight of resin solids in the coating composition.

The amount of crosslinking agent in the curable film-forming composition generally may range from 5 to 75 wt.-%, based on the total weight of resin solids in the curable film-forming composition. For example, the amount of crosslinking agent may be at least 5 wt.-%, or at least 10 wt.-%, or at least 15 wt.-%, and often at least 20 wt.-%, and up to 75 wt.-%, or up to 60 wt.-%, or up to 55 wt.-%, or often up to 50 wt.-%, based on the total weight of resin solids in the curable film-forming composition. Ranges of crosslinking agent may include, for example, 10 to 60 wt.-%, 15 to 55 wt.-%, or 20 to 50 wt.-%, based on the total weight of resin solids in the curable film-forming composition.

The ratio of functional groups in the binder, e.g. the hydroxy groups (OH) of a polyol, which are capable of reacting with the functional groups of the crosslinking agent to said functional groups in the crosslinking agent, e.g. the isocyanate groups (NCO) of a polyisocyanate, generally may range from 0.6:1.0 to 1.4:1.0 and may range e.g. from 0.8:1.0 to 1.2:1.0.

The curable film-forming composition of the present invention may further comprise additional polymeric resins. The curable film-forming composition of the present invention may comprise additional polymeric polyol resins, such as a polyester polyol, a polysiloxane polyol, or a mixture thereof.

Polyester polyols may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylol propane, and pentaerythritol. Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

When used, the polyester polyol may be present in the curable film-forming composition in an amount of at least 1 wt.-%, or at least 2 wt.-%, or at least 5 wt.-%, or at least 10 wt.-% and up to 30 wt.-%, or up to 25 wt.-%, or up to 20 wt.-%, based on the total weight of resin solids in the curable film-forming composition. Ranges of polyester polyol may include from 1 to 30 wt.-%, such as from 5 to 25 wt.-% or from 10 to 20 wt.-%, based on the total weight of resin solids in the curable film-forming composition.

Polysiloxane polyols suitable to be used in the film-forming composition of the present invention include the reaction product of a polysiloxane containing silicon hydride, such as those commercially available as MASIL-WAX BASE from BASF, Ludwigshafen, Germany, and a polyol compound having an aliphatically unsaturated linkage in the molecule, such as those disclosed in U.S. Pat. No. 5,916,992. Examples of such polyol compounds are those obtained by the reaction of allyl alcohol and trimethylol propane.

When used, the polysiloxane polyol may be present in the curable film-forming composition in an amount of at least 0.5 wt.-%, or at least 1.0 wt.-%, or at least 1.5 wt.-%, and up to 10 wt.-%, or up to 7.5 wt.-%, or up to 5 wt.-%, based on the total weight of resin solids in the curable film-forming composition. Ranges of polysiloxane polyol may include from 0.5 to 10 wt.-%, such as from 1.0 to 7.5 wt.-% or from 1.5 to 5 wt.-%, based on the total weight of resin solids in the curable film-forming composition.

The thermally curable film-forming composition of the present invention may additionally include other optional ingredients commonly used in such compositions. For example, the composition may further comprise a hindered amine light stabilizer for UV degradation resistance. Such hindered amine light stabilizers include those disclosed in U.S. Pat. No. 5,260,135. When they are used they are present in the composition in an amount of 0.1 to 2 wt.-%, based on the total weight of resin solids in the film-forming composition. Other optional additives may be included such as colorants, plasticizers, abrasion-resistant particles, film strengthening particles, fillers, catalysts such as dodecylbenzene sulfonic acid blocked with diisopropanolamine, antioxidants, biocides, defoamers, surfactants, wetting agents, dispersing aids, adhesion promoters, UV light absorbers and stabilizers, a stabilizing agent, organic cosolvents, reactive diluents, grind vehicles, and other customary auxiliaries, or combinations thereof.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

As noted above, the colorant can be in the form of a dispersion including, but not limited to, a nanoparticle dispersion. Nanoparticle dispersions can include highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discrete "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. Special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

A photosensitive composition and/or photochromic composition, which reversibly alters its color when exposed to a light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one example, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

The photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the film-forming composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

As used herein, the terms "adhesion promoter" and "adhesion promoting component" refer to any material that, when included in the composition, enhances the adhesion of the film-forming composition to a metal substrate. Such an adhesion promoting component often comprises a free acid. As used herein, the term "free acid" is meant to encompass organic and/or inorganic acids that are included as a separate component of the compositions as opposed to any acids that may be used to form a polymer that may be present in the composition. The free acid may comprise tannic acid, gallic acid, phosphoric acid, phosphorous acid, citric acid, malonic acid, a derivative thereof, or a mixture thereof. Suitable derivatives include esters, amides, and/or metal complexes of such acids. Often, the free acid comprises a phosphoric acid, such as a 100 percent orthophosphoric acid, superphosphoric acid or the aqueous solutions thereof, such as a 70 to 90 percent phosphoric acid solution.

In addition to or in lieu of such free acids, other suitable adhesion promoting components are metal phosphates, organophosphates, and organophosphonates. Suitable organophosphates and organophosphonates include those disclosed in U.S. Pat. No. 6,440,580 at column 3, line 24 to column 6, line 22, U.S. Pat. No. 5,294,265 at column 1, line 53 to column 2, line 55, and U.S. Pat. No. 5,306,526 at column 2, line 15 to column 3, line 8, the cited portions of which are incorporated herein by reference. Suitable metal phosphates include, for example, zinc phosphate, iron phosphate, manganese phosphate, calcium phosphate, magnesium phosphate, cobalt phosphate, zinc-iron phosphate, zinc-manganese phosphate, zinc-calcium phosphate, including the materials described in U.S. Pat. Nos. 4,941,930, 5,238,506, and 5,653,790. As noted above, in certain situations, phosphates are excluded.

The adhesion promoting component may comprise a phosphatized epoxy resin. Such resins may comprise the reaction product of epoxy-functional materials and phosphorus-containing materials. Non-limiting examples of such materials, which are suitable for use in the present invention, are disclosed in U.S. Pat. No. 6,159,549 at column 3, lines 19 to 62, the cited portion of which is incorporated by reference herein.

The curable film-forming composition of the present invention may also comprise alkoxysilane adhesion promoting agents, for example, acryloxyalkoxysilanes, such as γ-acryloxypropyltrimethoxysilane and methacrylatoalkoxysilane, such as γ-methacryloxypropyltrimethoxysilane, as well as epoxy-functional silanes, such as γ-glycidoxypropyltrimethoxysilane. Exemplary suitable alkoxysilanes are described in U.S. Pat. No. 6,774,168 at column 2, lines 23 to 65, the cited portion of which is incorporated by reference herein. Siloxane borates are also suitable.

The adhesion promoting component is usually present in the film-forming composition in an amount ranging from 0.10 to 10 wt.-%, such as at least 0.15 wt.-% or at least 0.20 wt.-% or 0.25 wt.-% or at least 0.5 wt.-%, and up to 7.5 wt.-% or up to 5 wt.-% or up to 2.5 wt.-% or up to 1.5 wt.-%, with ranges such as 0.15 to 7.5 wt.-%, or 0.20 to 5 wt.-%, or 0.25 to 2.5 wt.-% or 0.5 to 1.5 wt.-%, with the percentages by weight being based on the total weight of resin solids in the composition.

The film-forming compositions of the present invention may be solventborne compositions. Among others, the organic solvent dissolves or disperses the binder and optionally further ingredients of the film-forming composition and is selected to have sufficient volatility to evaporate from the coating composition during the curing process. Examples of suitable organic solvents include aliphatic hydrocarbons such as mineral spirits and high flash point VM&P naphtha; aromatic hydrocarbons such as benzene, toluene, xylene and solvent naphtha 100, 150, 200 and the like; alcohols, for example, ethanol, n-propanol, isopropanol, n-butanol and the like; ketones such as acetone, cyclohexanone, methyl isobutyl ketone and the like; esters such as ethyl acetate, butyl acetate, and the like; glycols such as butyl glycol, glycol ethers such as methoxypropanol and ethylene glycol monomethyl ether and ethylene glycol monobutyl ether and the like. Mixtures of various organic solvents can also be used. When present, the solvent is used in the coating compositions in amounts of 20 to 70 wt.-%, such as 30 to 60 wt.-%, such as 35 to 50 wt.-% based on total weight of the coating composition.

The curable film-forming compositions of the present invention may be formulated to a resin solids content of at least 30 wt.-%, such as at least 40 wt.-%, such as at least 50 wt.-% or at least 55 wt. %, based on the total weight of the curable film-forming composition. An exemplary composition has a solids content of 57 to 59 percent, as measured using a Mettler-Toledo HX204 Moisture Analyzer at 140° C.

The curable film-forming compositions of the present inventions may be clear coat compositions, such as 2K clear coat compositions. The curable film-forming compositions of the present inventions may have thixotropic properties and may be sprayable.

The curable film-forming compositions of the present invention may be applied to a substrate surface and cured to form a coating layer as described below.

The present invention further provides a method for forming a cured coating layer on a substrate comprising applying the film-forming composition of the present invention as described above to at least a portion of a surface of the substrate and thermally curing the applied composition.

Substrates to which compositions of the present invention may be applied include rigid metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. The substrate may alternatively comprise a polymer or a composite material such as a fiberglass composite. Car parts typically formed from thermoplastic and thermoset materials include bumpers and trim.

Steel substrates (such as cold rolled steel or any of the steel substrates listed above) coated with a weldable, zinc-rich or iron phosphide-rich organic coating are also suitable for use in the present invention. Such weldable coating compositions are disclosed in U.S. Pat. Nos. 4,157,924 and 4,186,036. Cold rolled steel is also suitable when pretreated with an appropriate solution known in the art, such as a metal phosphate solution, an aqueous solution containing a Group IIIB or IVB metal, an organophosphate solution, an organophosphonate solution, and combinations thereof, as discussed below. Examples of aluminum alloys include those alloys used in the automotive or aerospace industry, such as 2000, 6000, or 7000 series aluminums; 2024, 7075, 6061 are particular examples. Alloys may be unclad or they may contain a clad layer on a surface, the clad layer consisting of a different aluminum alloy than the base/bulk alloy beneath the clad layer.

The substrate may alternatively comprise more than one metal or metal alloy in that the substrate may be a combination of two or more metal substrates assembled together such as hot-dipped galvanized steel assembled with aluminum substrates.

The film-forming compositions of the present invention may be used in various industries to impart a decorative and/or protective finish. For example, the film-forming compositions may be applied to a vehicle or a portion thereof. The term "vehicle" is used herein in its broadest sense and includes all types of vehicles, such as, but not limited to, cars, trucks, buses, vans, golf carts, motorcycles, bicycles, railroad cars, boats, ships, airplanes, helicopters, and the like. The substrate may comprise portion of a vehicle. It will be appreciated that the portion of the vehicle that is coated according to the present invention may vary depending on why the coating is being used.

The shape of the metal substrate can be in the form of a sheet, plate, bar, rod or any shape desired, but it is usually in the form of an automobile part, such as a body, door, trunk lid, fender, hood or bumper. The thickness of the substrate can vary as desired.

The curable film-forming composition may be applied directly to the metal substrate when there is no intermediate coating between the substrate and the curable film-forming composition. By this is meant that the substrate may be bare, as described below, or may be treated with a pretreatment composition as described below, but the substrate is not coated with any coating compositions such as an electrodepositable composition or a primer composition prior to application of the curable film-forming composition of the present invention.

As noted above, the substrates to be used may be bare metal substrates. By "bare" is meant a virgin metal substrate that has not been treated with any pretreatment compositions such as conventional phosphating baths, heavy metal rinses, etc. Additionally, bare metal substrates being used in the present invention may be a cut edge of a substrate that is otherwise treated and/or coated over the rest of its surface. Alternatively, the substrates may undergo treatment steps known in the art prior to the application of the curable film-forming composition.

The substrate may optionally be cleaned using conventional cleaning procedures and materials. These would include mild or strong alkaline cleaners such as are commercially available and conventionally used in metal pretreatment processes. Examples of alkaline cleaners include Chemkleen 163 and Chemkleen 177, both of which are available from PPG Industries, Pretreatment and Specialty Products. Such cleaners are generally followed and/or preceded by a water rinse. The metal surface may also be rinsed with an aqueous acidic solution after or in place of cleaning with the alkaline cleaner. Examples of rinse solutions include mild or strong acidic cleaners such as the dilute nitric acid solutions commercially available and conventionally used in metal pretreatment processes.

According to the present invention, at least a portion of a cleaned aluminum substrate surface may be deoxidized, mechanically or chemically. As used herein, the term "deoxidize" means removal of the oxide layer found on the surface of the substrate in order to promote uniform deposition of the pretreatment composition (described below), as well as to promote the adhesion of the pretreatment composition coating to the substrate surface. Suitable deoxidizers will be familiar to those skilled in the art. A typical mechanical deoxidizer may be uniform roughening of the substrate surface, such as by using a scouring or cleaning pad. Typical chemical deoxidizers include, for example, acid-based deoxidizers such as phosphoric acid, nitric acid, fluoroboric acid, sulfuric acid, chromic acid, hydrofluoric acid, and ammonium bifluoride, or Amchem 7/17 deoxidizers (available from Henkel Technologies, Madison Heights, MI), OAKITE DEOXIDIZER LNC (commercially available from Chemetall), TURCO DEOXIDIZER 6 (commercially available from Henkel), or combinations thereof. Often, the chemical deoxidizer comprises a carrier, often an aqueous medium, so that the deoxidizer may be in the form of a solution or dispersion in the carrier, in which case the solution or dispersion may be brought into contact with the substrate by any of a variety of known techniques, such as dipping or immersion, spraying, intermittent spraying, dipping followed by spraying, spraying followed by dipping, brushing, or roll-coating.

A metal substrate may optionally be pretreated with any suitable solution known in the art, such as a metal phosphate solution, an aqueous solution containing a Group IIIB or IVB metal, an organophosphate solution, an organophosphonate solution, and combinations thereof. The pretreatment solutions may be essentially free of environmentally detrimental heavy metals such as chromium and nickel. Suitable phosphate conversion coating compositions may be any of those known in the art that are free of heavy metals. Examples include zinc phosphate, which is used most often, iron phosphate, manganese phosphate, calcium phosphate, magnesium phosphate, cobalt phosphate, zinc-iron phosphate, zinc-manganese phosphate, zinc-calcium phosphate, and layers of other types, which may contain multivalent cations. Phosphating compositions are known to those skilled in the art and are described in U.S. Pat. Nos. 4,941,930, 5,238,506, and 5,653,790.

The IIIB or IVB transition metals and rare earth metals referred to herein are those elements included in such groups in the CAS Periodic Table of the Elements as is shown, for example, in the Handbook of Chemistry and Physics, 63rd Edition (1983).

Typical group IIIB and IVB transition metal compounds and rare earth metal compounds are compounds of zirconium, titanium, hafnium, yttrium and cerium and mixtures thereof. Typical zirconium compounds may be selected from hexafluorozirconic acid, alkali metal and ammonium salts thereof, ammonium zirconium carbonate, zirconyl nitrate, zirconium carboxylates and zirconium hydroxy carboxylates such as hydrofluorozirconic acid, zirconium acetate, zirconium oxalate, ammonium zirconium glycolate, ammonium zirconium lactate, ammonium zirconium citrate, and mixtures thereof. Hexafluorozirconic acid is used most often. An example of a titanium compound is fluorotitanic acid and its salts. An example of a hafnium compound is hafnium nitrate. An example of an yttrium compound is yttrium nitrate. An example of a cerium compound is cerous nitrate.

Typical compositions to be used in the pretreatment step include non-conductive organophosphate and organophosphonate pretreatment compositions such as those disclosed in U.S. Pat. Nos. 5,294,265 and 5,306,526. Such organophosphate or organophosphonate pretreatments are available commercially from PPG Industries, Inc. under the name NUPAL®.

In the aerospace industry, anodized surface treatments as well as chromium based conversion coatings/pretreatments are often used on aluminum alloy substrates. Examples of anodized surface treatments would be chromic acid anodizing, phosphoric acid anodizing, boric acid-sulfuric acid anodizing, tartaric acid anodizing, sulfuric acid anodizing. Chromium based conversion coatings would include hexavalent chromium types, such as Bonderite® M-CR1200 from Henkel, and trivalent chromium types, such as Bonderite® M-CR T5900 from Henkel.

The curable film-forming composition of the present invention may be applied to the substrate using conventional techniques including dipping or immersion, spraying, intermittent spraying, dipping followed by spraying, spraying followed by dipping, brushing, or roll-coating. For instance, the curable film-forming composition of the present invention may be applied by spraying a layer of the composition onto at least a portion of a surface of the substrate. For instance, one, two or three layers of the film-forming composition of the present invention may be applied.

The film-forming compositions of the present invention may be used alone as a protective layer or may serve as a unicoat, or monocoat layer. Alternatively, the compositions of the present invention may be in combination as primers, basecoats, and/or topcoats. For instance, in a multi-component composite coating comprising a first film-forming composition applied to a substrate to form a colored base coat, and a second, transparent film-forming composition applied on top of the base coat to form a clear top coat, the transparent film-forming composition may comprise the curable film-forming composition of the present invention as described above. The term "transparent", as used for example in connection with a substrate, film, material and/or coating, means that the indicated substrate, coating, film and/or material is optically clear and has the property of transmitting light without appreciable scattering so that objects lying beyond are entirely visible.

Suitable base coats include any of those known in the art, and may be waterborne, solventborne or powdered. The base coat typically includes a film-forming resin, crosslinking material and pigment. Non-limiting examples of suitable base coat compositions include waterborne base coats such as are disclosed in U.S. Pat. Nos. 4,403,003; 4,147,679; and 5,071,904.

During coating at least a portion or even all of the surfaces coated using the method of the present invention may be placed in a non-horizontal orientation, such as e.g. vertically, where sagging usually is most pronounced. However, the method of the present invention of course is also suitable for coating horizontally oriented surfaces.

After application of each composition to the substrate, a film is formed on the surface of the substrate by driving solvent, i.e., organic solvent and/or water, out of the film by heating or by an air-drying period. Suitable drying conditions will depend on the particular composition and/or application. More than one coating layer of each composition may be applied if desired. Usually between coats, the previously applied coat is flashed; that is, exposed to ambient conditions for the desired amount of time.

Thermally curing the present film-forming composition applied to at least a portion of a surface of the substrate may comprise maintaining the surface at a temperature in the range of from 20 to 25° C. for 2 to 15 minutes (flash-off), followed by heating the at least partially coated substrate to an elevated temperature of at least 60° C. within 5 to 15 min and maintaining the at least partially coated substrate at said elevated temperature for at least another 15 min.

Upon heating, residual solvents are driven off and crosslinkable components of the composition are crosslinked. The heating and curing operation is usually carried out at a temperature in the range of from 60 to 180° C., such as e.g. from 60 to below 80° C. for refinish applications and e.g. from 120 to 160° C. for OEM applications, but, if needed, lower or higher temperatures may be used. Additionally, a first coating composition may be applied and then the second applied thereto "wet-on-wet", or a base coat may be applied on top of a primer before the primer is cured, followed by application of a clear coat to the base coat(s) before the base coat(s) is cured; i.e., "wet-on-wet-on-wet" or "3-wet", and the entire multi-layer coating stack cured simultaneously in a compact process (also known as 3C1B or B1B2). Alternatively, each coating composition can be cured before application of the next coating composition.

The thickness of the cured coating layer obtained from the present film-forming composition may vary and may range e.g. from 2.5 to 75 μm (0.1 to 3 mils), such as from 25 to 75 μm (1 to 3 mils).

In the method of the present invention, a primer may be applied to the substrate to form a primer coating upon the surface of the substrate prior to applying a film-forming composition. For instance, a first film-forming composition different from the one of the present invention, such as e.g. a base coat may be applied directly onto the primer coating. Again, the primer coating may be cured prior to application of the first film-forming composition, or the first film-forming composition may be applied on top of a primer before the primer is cured, followed by application of the film-forming composition according to the present invention, e.g. in form of a clear coat, to the base coat(s) before the base coat(s) is cured in a "wet-on-wet-on-wet" process, and then the entire multi-layer coating stack may be cured simultaneously in a compact process. The method of the present invention may further comprise holding the coated substrate at a temperature and for a time sufficient to substantially cure the composite coating after all coating compositions have been applied to the substrate. Application and curing methods and conditions may be as described above.

The invention further relates to a substrate comprising a cured coating layer obtained by applying the film-forming composition of the present invention to at least a portion of a surface of the substrate and thermally curing the applied composition. Suitable substrates as well as conditions for applying and thermally curing the compositions have been described above. For instance, the composition may be a clear coat composition and the substrate may be a vehicle or a portion thereof and optionally may comprise an additional coating layer disposed below the coating layer obtained from the clear coat composition, such as e.g. primer and/or base coat layers.

Each of the characteristics and examples described above, and combinations thereof, may be said to be encompassed by the present invention. Some non-limiting aspects of the present invention are summarized in the following numbered clauses:

Aspects of the Invention

1. A thermally curable film-forming composition comprising a binder, a flow control system comprising a sag control agent for controlling the viscosity of the film-forming composition applied to a surface, wherein during flash off and thermally curing the film-forming composition does not drop below the initial complex viscosity $\eta^*$, and wherein the film-forming composition comprises less than 5.0 wt.-% of melamine-based components, based on the total weight of resin solids in the film-forming composition.
2. The composition of aspect 1 wherein the binder comprises an acrylic polyol.
3. The composition of any of the preceding aspects wherein the composition comprises 20 to 70 wt.-% of a polyol, based on the total weight of resin solids in the film-forming composition.
4. The composition of any of the preceding aspects wherein the flow control system comprises a sag control agent which is particulate at a temperature of 23° C. in the absence of a shear force and a solvent.
5. The composition of any of the preceding aspects wherein the sag control agent comprises a urea-type sag control agent.
6. The composition of any of the preceding aspects wherein composition comprises 0.2 to 2 wt.-% of the sag control agent, based on the total amount of solids in the film-forming composition.
7. The composition of any of the preceding aspects further comprising a crosslinking agent.
8. The composition of aspect 7 wherein the thermally curable film-forming composition is a two-component composition comprising a first component comprising a crosslinkable resin and a second component comprising the crosslinking agent, wherein the flow control system may be present in any of the first component or the second component or both.
9. The composition of aspect 7 or aspect 8 wherein the crosslinking agent comprises a polyisocyanate.
10. The composition of any of aspects 7 to 9 wherein the ratio of functional groups in the binder capable of reacting with the functional groups of the crosslinking agent ranges to said functional groups in the crosslinking agent ranges from 0.8:1 to 1.2:1.
11. The composition any of the preceding aspects further comprising an additional polymeric polyol resin.
12. The composition any of the preceding aspects further comprising 30 to 60 wt.-% of an organic solvent, based on the total weight of the film-forming composition.

13. The composition of any of the preceding aspects comprising less than 1 wt.-% of silica-based rheology control agent, based on the total amount of solids in the film-forming composition.

14. The composition of any of the preceding aspects having an initial complex viscosity $\eta^*_1$ of at least 150 cP.

15. A method of forming a cured coating layer on a substrate comprising applying a composition according to any of the preceding aspects to at least a portion of a surface of the substrate and thermally curing the applied composition.

16. The method of aspect 15 wherein applying the composition comprises spraying the composition onto at least a portion of a surface of the substrate to form a layer.

17. The method of aspect 15 or aspect 16 wherein thermally curing the composition applied to at least a portion of a surface of the substrate comprises maintaining the surface at a temperature in the range of from 20 to 25° C. for 2 to 15 minutes, followed by heating the at least partially coated substrate to an elevated temperature of at least 60° C. within 5 to 15 min and maintaining the at least partially coated substrate at said elevated temperature for at least another 15 min.

18. The method of any of aspects 15 to 17 wherein the film thickness of the cured coating layer ranges from 25 to 75 μm.

19. A substrate comprising a cured coating layer obtained by applying a composition according to any of aspects 1 to 15 to at least a portion of a surface of the substrate and thermally curing the applied composition.

20. The substrate of aspect 19 wherein the composition is a clear coat composition and the substrate is a vehicle or a portion thereof which optionally may comprise an additional coating layer disposed below the coating layer obtained from the clear coat composition.

21. The substrate of aspect 19 or aspect 20, wherein the composition is applied and the applied composition is thermally cured using the method according to any of aspects 15 to 18.

The invention will be further described by reference to the following non-limiting examples. Unless otherwise indicated, all parts are by weight.

EXAMPLES

Example 1: Multi-Layer Coating System Comprising a Clear Coat with Controlled Rheological Profile A water-borne basecoat system comprising two coating layers (available from PPG Industries, Inc.) was applied over a 4-inch by 12-inch cold-rolled steel substrate panel pre-coated with EPIC electrocoat (electrocoat available from PPG Industries, Inc., and substrate panels available in pre-coated form from ACT Test Panels LLC). The coating layers were applied under controlled conditions of 20-22° C. temperature and 60-65% relative humidity. The first coating layer of the basecoat system was sprayed over the electrocoat on the substrate panel using a conventional OEM robotic spray equipment. The first coating layer of the basecoat system was allowed to dry for 5 minutes under ambient conditions.

The second coating layer of the basecoat system was sprayed over the dried first coating layer of the basecoat system using a conventional OEM robotic spray equipment. The second coating layer was sprayed in two consecutive coats without any intermediate drying between spray applications. The two coating layers of the basecoat system where then allowed to dry for 5 minutes under ambient conditions and thereafter dehydrated for 7 minutes at 70° C. The film thickness of the basecoat system (both coating layers) after dehydrating was approximately 34-40 micrometers.

The clear coat composition according to the present invention comprised the components listed in Table 1. Clear coat compositions (according to the present invention and control) were applied over the dehydrated basecoat system to form third coating layers on the substrate panels.

TABLE 1

| Component | Experimental Clear Coat (parts by weight/grams) |
|---|---|
| Resin A[1] | 78.9 |
| SCA [2] | 34.9 |
| Polyester polyol[3] | 16.7 |
| Crosslinker [4] | 45.0 |

[1]The resin component of a 2K isocyanate-cured polyurethane clear coat, described below.
[2] Urea adduct of benzylamine and 1,6-hexamethylene diisocyanate in acrylic polyol. 56% solids in a mix of aromatic hydrocarbons. 0.78 wt.-% crystal load (determined as described below).
[3]Polyester polyol derived from neopentyl glycol and hexahydrophthalic anhydride.
[4] A mixture of 5.36 parts-by-weight DESMODUR N-3390 (a 90% solids hexamethylene diisocyanate (HDI) trimer (isocyanurate ring) available from Covestro LLC) and 1.0 parts-by-weight DESMODUR Z 44700 (a 70% solids isophorone diisocyanate (IPDI) trimer (isocyanurate ring) available from Covestro LLC).

Resin A was prepared by mixing the components listed in Table 2 under agitation in the listed order.

TABLE 2

| Components | Parts by weight |
|---|---|
| n-Amyl Acetate | 14.9 |
| Solvesso 100 | 10.2 |
| Butanol | 7.6 |
| Butyl Carbitol Acetate | 7.8 |
| TINUVIN 928 [1] | 1.5 |
| Acrylic polyol [2] | 28.8 |
| TINUVIN 292 [3] | 1.8 |
| Flow additive [4] | 0.15 |
| Melamine[5] | 6.1 |

[1]2-(2H-Benzotriazol-2yl)-6-(1-methyl-1-phenylethyl)-4-(1,1,3,3- tetramethylbutyl)phenol UV absorber available from Ciba Specialty Chemicals Corp.
[2] Acrylic polyol obtained by copolymerizing a monomer mixture comprising: (i) 35 to 45 wt.-% of a beta-hydroxy ester functional monomer, prepared from an acrylic acid and Cardura E-10; (ii) 15 to 20 wt.-% of hydroxyethyl methacrylate; (iii) 25 to 30 wt.-% of styrene; and (iv) 10 to 15 wt.-% of 2-ethylhexyl acrylate, wherein the amounts are based on the total weight of monomers in the monomer mixture 64% solids in a mixture of aromatic hydrocarbons.
[3] Hindered amine light stabilizer available from Ciba-Geigy Corp.
[4] Polybutylacrylate (60 percent solids in xylene).
[5]Cymel 202, available from Cytec Industries, Inc; corresponding to 4.9 wt.-% melamine, based on the total weight of resin solids in the film-forming composition A gravimetric method is used to determine the SCA crystal load as a percentage of the carrier vehicle dispersion. A specific known quantity of the SCA-containing sample is added into a tared pre-weighed centrifuge tube. The tube is filled with excess tetrahydrofuran (THF) and undergoes successive centrifugation steps with removal of the THF-soluble supernatant material in between until resin is no longer visible and the supernatant appears clear. The tube is then heated in an oven for sixty minutes at 110° C. to remove residual solvent. After removal from the oven, the tube is cooled, reweighed, and the THF-insoluble content (neat SCA without carrier vehicle) is calculated as a percentage of the carrier vehicle dispersion. The amount of SCA crystal load in the complete clear coat formulation can thus be inferred based on this calculated percentage of the SCA carrier vehicle dispersion and the parts by weight of this material in the total formula.

The clear coat layers were sprayed over the dehydrated basecoat system on the substrate panels using a conventional OEM robotic spray equipment. The clear coat layers were sprayed in two consecutive coats without any intermediate drying between spray applications. The clear coat layers were then allowed to dry for 7 minutes under ambient conditions and thereafter the multi-layer coatings were baked for 30 minutes 140° C. The film thicknesses of the clear coat layers after the bake were approximately 50-51 micrometers.

As a control, a typical clear coat composition comprising acrylic and polyester polyols, solvents and further additives (UV absorber, hindered amine light stabilizer, flow additive) as given above, but comprising a higher amount of melamine (9.1 wt.-%, based on the total weight of resin solids in the control film-forming composition, compared to 4.9 wt.-% in the film-forming composition of the present invention) and 5.4 wt.-%, based on the total weight of the composition, of a flow control agent comprising a dispersion of colloidal silica in polysiloxane polyol as described in Example A of EP 2 247 632 B1.

The experimental and control multi-layer coatings were evaluated for the appearance and physical properties listed in Table 3.

Surface waviness is an indication of the roughness of a surface, and may be measured using a wave scan instrument such as the BYK Wave-scan Dual instrument available from BYK Gardner USA, which measures surface topography via an optical profile. The wave scan instrument uses a point source (i.e. laser) to illuminate the surface over a predetermined distance, for example 10 centimeters, at an angle of incidence of 60°. The reflected light is measured at the same, but opposite angle. As the light beam hits a "peak" or "valley" of the surface, a maximum signal is detected; when the beam hits a "slope" of a peak/valley a minimum signal is registered. The measured signal frequency is equal to double spatial frequency of the coating surface topography. The surface "waviness" is differentiated into longterm and shortterm waviness ("longwave" and "shortwave") to simulate visual evaluation by the human eye. Data are divided into longwave (structure size>0.6 mm) and shortwave (structure size<0.6 mm) signals using a mathematical filter function. Each range in value from 0 to 50. Longterm waviness represents the variance of the longwave signal amplitude, while the shortterm waviness represents variance of the shortwave signal amplitude. The long- and shortterm waviness of a coating surface can give an indirect measure of topography-influencing factors such as substrate roughness, and flow and leveling properties of coatings. Longwave and shortwave values may be determined using the BYK Wave-scan Dual instrument in accordance with the manufacturer's suggested method of operation. Longwave and shortwave values of lesser magnitude are indicative of coatings that are smoother in appearance.

Sag measurements were conducted by applying the relevant coating stack over a panel with holes (with diameter of 7 mm) that was painted, flashed and cured as described above while in a vertical orientation. Using a ruler, the measured distance between the bottom of a given hole and the bottom of the visible sag defect (in mm) is considered a reading, and the results are reported as an average of 5 readings from different holes on the same panel.

TABLE 3

| Example | Vertical Longwave[1] | Vertical Shortwave[2] | Horizontal Longwave[1] | Horizontal Shortwave[2] | Sag (mm) |
|---|---|---|---|---|---|
| Control | 7.3 | 15 | 3.1 | 11 | 40 |
| Experimental | 4.2 | 12 | 2.4 | 10 | 1 |

[1]Longwave surface texture was measured with a BYK Wave-scan Dual instrument (available from BYK Additives & Instruments) following the instrument's instrument manual (lower longwave values are generally considered more aesthetic and desirable in coating compositions).
[2]Shortwave surface texture was measured with a BYK Wave-scan Dual instrument (available from BYK Additives & Instruments) following the instrument's instrument manual (lower shortwave values are generally considered more aesthetic and desirable in coating compositions).

Using an Anton Paar MCR 302 rotational rheometer (Anton Paar GmbH, Graz, Austria) the rheological profile/viscosity change of the film-forming compositions during application, drying, and cure was evaluated as follows: 25 mm ring plate and 0.15 mm gap; samples are drawn down by a 6-mil draw-down bar; Complex viscosity, $\eta^*$, (Stress: 1 Pa, Frequency: 1 Hz) were recorded over time with the first data point (initial complex viscosity, $\eta^*_1$) recorded 12 seconds after high shear stress is stopped; Temperature Ramp: 1) Ambient flash (25° C.) for 10 min. 2) Ramp temperature up to 140° C. in 7 min. 3) Hold temperature at 140° C. for 10 min. Prior to entering the oscillatory mode, i.e. before measurements starts, high shear stress is applied at the system to simulate the rotary atomization process through large-amplitude oscillatory shear (Frequency=1 Hz, Amplitude=10,000%, max. Shear Rate=628 $s^{-1}$).

Table 4 describes the rheological profile of the clear coats:

TABLE 4

| Complex Viscosity, $\eta^*$ | Example 1 | Control |
|---|---|---|
| Initial value, $\eta^*_1$ (T = 25° C.) | 200 cP | 320 cP |
| Maximum value during flash, $\eta^*_{max}$ (T = 25° C.) | 1080 cP | 900 cP |
| Minimum value during bake, $\eta^*_{min}$ (25° C. < T ≤ 140° C.) | 280 cP | 60 cP |
| Ratio of minimum complex viscosity, $\eta^*_{min}$ during bake to initial complex viscosity, $\eta^*_1$ | 1.40 | 0.19 |
| Ratio of maximum complex viscosity, $\eta^*_{max}$ during flash to initial complex viscosity, $\eta^*_1$ | 5.40 | 2.81 |

As shown in Table 3, the multi-layer coating of the present invention exhibited better longwave and shortwave appearance than the control multilayer coating in both horizontal and vertical orientations. The rheological profile depicted in Table 4 describes parameters relative to the control: 1) a significant gain of viscosity during the ambient flash due to the thixotropic nature of the coating, and 2) a reduced drop in viscosity at elevated temperatures prior to cure (higher minimum viscosity during bake) relative to both the initial viscosity and the maximum value during the flash. During the temperature ramp and the entire bake process, the minimum viscosity does not decrease to a value lower than the initial value of viscosity of the clear coat despite the increase in temperature. Evidence of this viscosity behavior is also characterized by the large reduction in sag for the present invention relative to the control.

Whereas particular examples of this invention have been described above for purposes of illustration, it will be evident to those skilled in the art that numerous variations of the details of the present invention may be made without departing from the invention as defined in the appended claims.

What is claimed is:

1. A thermally curable film-forming composition comprising a binder, a flow control system comprising a sag control agent for controlling the viscosity of the film-forming composition applied to a surface,
wherein the film-forming composition comprises melamine-based components and the melamine-based components are present in the film-forming composition at less than 5.0 wt.-%, based on a total weight of resin solids in the film-forming composition, wherein the sag control agent comprises a reaction product of reactants consisting of an amine and an isocyanate,
wherein the film-forming composition does not have a complex viscosity, $\eta^*$, below an initial complex viscosity $\eta^*_1$ at any point during flash off and thermal curing; and
wherein the rheological properties of the film-forming composition are determined by first applying a large amplitude oscillatory shear at a frequency of 1 Hz and an amplitude of 10000% with a maximum shear rate of 628 $s^{-1}$ followed 12 seconds after stopping the large amplitude oscillatory shear by determining an initial complex viscosity, $\eta^*_1$, at a stress of 1 Pa and frequency of 1 Hz at 25° C.;
and
wherein the large amplitude oscillatory shear is applied, and the initial complex viscosity, $\eta^*_1$, and the complex viscosity, $\eta^*$, are determined using a rotational rheometer in oscillatory mode using a 25 mm ring plate, 0.15 mm gap, stress of 1 Pa, and frequency of 1 Hz.

2. The composition of claim 1 wherein the binder comprises an acrylic polyol.

3. The composition of claim 1 wherein the composition comprises 20 to 70 wt.-% of a polyol, based on the total weight of resin solids in the film-forming composition.

4. The composition of claim 1 wherein the flow control system comprises a sag control agent which comprises particulates at a temperature of 23° C. in the absence of a shear force and a solvent.

5. The composition of claim 1, wherein the sag control agent comprises a urea-type sag control agent,
wherein the sag control agent comprises the reaction product of reactants consisting of toluene diisocyanate, 4,4'-methylene-bis(cyclohexyl isocyanate), isophorone diisocyanate, 2,2,4-trimethyl hexamethylene diisocyanate, 2,4,4-trimethyl hexamethylene diisocyanate, 1,6-hexamethylene diisocyanate, tetramethyl xylylene diisocyanate and/or 4,4'-diphenylmethylene diisocyanate with ethylamine, isomeric propylamines, butylamines, pentylamines, hexylamines, cyclohexylamine, and/or benzylamine.

6. The composition of claim 1 wherein the film-forming composition comprises 0.2 to 2 wt.-% of the sag control agent, based on the total amount of solids in the film-forming composition.

7. The composition of claim 1 further comprising a crosslinking agent.

8. The composition of claim 7 wherein the thermally curable film-forming composition is a two-component composition comprising a first component comprising a crosslinkable resin and a second component comprising the crosslinking agent, wherein the flow control system may be present in any of the first component or the second component or both.

9. The composition of claim 7 wherein the crosslinking agent comprises a polyisocyanate.

10. The composition of claim 7 wherein the film-forming composition comprises a binder having functional groups and a crosslinking agent having functional groups, wherein the functional groups in the binder are reactive with the functional groups in the crosslinking agent, and wherein the ratio of functional groups in the binder capable of reacting with the functional groups of the crosslinking agent to said functional groups in the crosslinking agent ranges from 0.8:1 to 1.2:1.

11. The composition of claim 1 further comprising a polymeric polyol resin.

12. The composition of claim 1 further comprising 30 to 60 wt.-% of an organic solvent, based on the total weight of the film-forming composition.

13. The composition of claim 1 comprising less than 1 wt.-% of a silica-based rheology control agent, based on the total amount of solids in the film-forming composition.

14. The composition of claim 1 having an initial complex viscosity $\eta^*_1$ of at least 150 cP.

15. A method of forming a cured coating layer on a substrate comprising:
selecting a thermally curable film-forming composition having the following properties:
the film-forming composition comprises a binder, a flow control system comprising a sag control agent for controlling the viscosity of the film-forming composition applied to a surface, and melamine-based components, wherein the melamine-based components are present in the film-forming composition at less than 5.0 wt.-%, based on a total weight of resin solids in the film-forming composition;
wherein the sag control agent comprises a reaction product of reactants consisting of an amine and an isocyanate;
wherein the film-forming composition does not have a complex viscosity, $\eta^*$, below an initial complex viscosity $\eta^*_1$ at any point during flash off and thermal curing;
wherein the rheological properties of the film-forming composition are determined by first applying a large amplitude oscillatory shear at a frequency of 1 Hz and an amplitude of 10000% with a maximum shear rate of 628 $s^{-1}$ followed 12 seconds after stopping the large amplitude oscillatory shear by determining the initial complex viscosity, $\eta^*_1$, at a stress of 1 Pa and frequency of 1 Hz at 25° C., and the large amplitude oscillatory shear is applied, and the initial complex viscosity, $\eta^*_1$, and the complex viscosity, $\eta^*$, are determined using a rotational rheometer in oscillatory mode using a 25 mm ring plate, 0.15 mm gap, stress of 1 Pa, and frequency of 1 Hz;
applying the curable film-forming composition to at least a portion of a surface of the substrate; and
thermally curing the applied composition.

16. The method of claim 15 wherein applying the composition comprises spraying the composition onto at least a portion of a surface of the substrate to form a layer.

17. The method of claim 15 wherein thermally curing the composition applied to at least a portion of a surface of the substrate comprises maintaining the surface at a temperature in the range of from 20 to 25° C. for 2 to 15 minutes, followed by heating the at least partially coated substrate to an elevated temperature of at least 60° C. within 5 to 15 min and maintaining the at least partially coated substrate at said elevated temperature for at least another 15 min.

18. The method of claim 15 wherein the film thickness of the cured coating layer ranges from 25 to 75 μm.

19. A substrate comprising a cured coating layer obtained by applying the composition according to claim 1 to at least a portion of a surface of the substrate and thermally curing the applied composition.

20. The substrate of claim 19 wherein the composition is a clear coat composition and the substrate is a vehicle or a portion thereof which optionally may comprise an additional coating layer disposed below the coating layer obtained from the clear coat composition.

\* \* \* \* \*